(12) United States Patent
Wajs

(10) Patent No.: US 11,025,977 B2
(45) Date of Patent: Jun. 1, 2021

(54) CONSTRUCTING A TRANSPORT STREAM

(75) Inventor: Andrew Augustine Wajs, Hoofddorp (NL)

(73) Assignee: IRDETO B.V., Hoofddorp (NL)

( * ) Notice: Subject to any disclaimer, the term of this patent is extended or adjusted under 35 U.S.C. 154(b) by 361 days.

(21) Appl. No.: 14/354,487

(22) PCT Filed: Nov. 2, 2011

(86) PCT No.: PCT/EP2011/069263
§ 371 (c)(1),
(2), (4) Date: Aug. 6, 2014

(87) PCT Pub. No.: WO2013/060391
PCT Pub. Date: May 2, 2013

(65) Prior Publication Data
US 2014/0344850 A1 Nov. 20, 2014

(30) Foreign Application Priority Data
Oct. 28, 2011 (WO) ................. PCT/EP2011/069051

(51) Int. Cl.
H04N 21/23 (2011.01)
H04N 21/266 (2011.01)
(Continued)

(52) U.S. Cl.
CPC ... *H04N 21/26606* (2013.01); *H04N 21/2347* (2013.01); *H04N 21/26613* (2013.01);
(Continued)

(58) Field of Classification Search
None
See application file for complete search history.

(56) References Cited

U.S. PATENT DOCUMENTS 5,838,678 A 11/1998 Davis et al.
6,064,676 A * 5/2000 Slattery ............ H04N 21/23608
370/412

(Continued)

FOREIGN PATENT DOCUMENTS

CN 101924907 B * 8/2013 ............. H04N 21/23
EP 1111923 A1 6/2001

(Continued)

OTHER PUBLICATIONS

Stenborgh, Distribution and individual watermarking of streamed content for copy protection, 2005, Thesis No. 1212, ALL.*

(Continued)

*Primary Examiner* — Nasser M Goodarzi
*Assistant Examiner* — Terrika Peterson
(74) *Attorney, Agent, or Firm* — Rimon PC, Marc Kaufman

(57) ABSTRACT

A plurality of sets of primary product keys is established or generated, each set containing at least two different primary product keys. One primary product key of each set is made available to each receiver or group of receivers, such that each receiver or group of receivers is provided with a different combination of said primary product keys. For each set of primary product keys, the plurality of receivers or groups of receivers is provided with a different primary entitlement control message corresponding to each primary product key of said set, each such primary entitlement control message distributing a primary control word for recovery through decryption using the corresponding primary product key. The primary control words can then be used for purposes such as tracing compromise of the conditional access system, or arranging for differently fingerprinted content to be decoded at different receivers or groups of receivers.

18 Claims, 14 Drawing Sheets

(51) Int. Cl.
*H04N 21/2347* (2011.01)
*H04N 21/4623* (2011.01)
*H04N 21/4405* (2011.01)
*H04N 21/6334* (2011.01)

(52) U.S. Cl.
CPC ..... *H04N 21/4405* (2013.01); *H04N 21/4623* (2013.01); *H04N 21/63345* (2013.01)

(56) References Cited

U.S. PATENT DOCUMENTS

| | | | |
|---|---|---|---|
| 7,415,440 B1* | 8/2008 | Fransdonk | G06F 21/10 705/50 |
| 7,881,478 B2* | 2/2011 | Derouet | H04N 7/163 380/255 |
| 2002/0067745 A1* | 6/2002 | Coupe et al. | 370/535 |
| 2002/0126847 A1* | 9/2002 | Wajs | H04N 7/163 380/255 |
| 2003/0009669 A1* | 1/2003 | White et al. | 713/176 |
| 2003/0021412 A1* | 1/2003 | Candelore et al. | 380/217 |
| 2003/0194091 A1* | 10/2003 | Wajs | H04L 9/0833 380/278 |
| 2004/0202331 A1* | 10/2004 | Derouet | H04N 7/163 380/281 |
| 2005/0152551 A1* | 7/2005 | Defreese et al. | 380/255 |
| 2008/0137850 A1 | 6/2008 | Mamidwar | |
| 2009/0097659 A1 | 4/2009 | Candelore | |
| 2009/0193252 A1* | 7/2009 | Wajs | G06F 21/606 713/165 |
| 2009/0323971 A1* | 12/2009 | Munguia et al. | 380/284 |
| 2011/0211695 A1* | 9/2011 | Westerveld | 380/212 |
| 2014/0259086 A1* | 9/2014 | Wajs | 725/116 |

FOREIGN PATENT DOCUMENTS

| | | | |
|---|---|---|---|
| EP | 1134977 A1 | 9/2001 | |
| EP | 2192773 A1 | 6/2010 | |
| EP | 2334070 A1 | 6/2011 | |
| EP | 2341708 A1 | 7/2011 | |
| EP | 2373020 A1 | 10/2011 | |
| EP | 1264436 B1 | 9/2014 | |
| WO | 0167667 A1 | 9/2001 | |
| WO | WO 2006122908 A1 * | 11/2006 | ............. H04H 60/23 |

OTHER PUBLICATIONS

International Search Report and Written Opinion cited in corresponding International Application No. PCT/EP2011/069051 dated Jul. 25, 2012.

International Search Report and Written Opinion cited in corresponding International Application No. PCT/EP2011/069263 dated Jul. 25, 2012.

Stenborg, "Distribution and individual watermarking of streamed content for copy protection", Dec. 31, 2005, pp. 1-100, XP002576297, URL:http://liu/diva-portal.org/smash/get/diva2:20656/FULLTEXT01.

Parviainen et al., "Large Scale Distributed Watermarking of Multicast Media Through Encryption", 2001, XP002239136, URL:http://citeseer.nj.nec.com7447585.html.

ETSI TS 103197 v1.4.1, Digital Video Broadcasting (DVB); Head-end implementation of DVB SimulCrypt, pp. 1-287, 2004.

ISO/IEC 13818-1, Information technology—Generic coding of moving pictures and associated audio information: Systems, 1-174, 2000.

Communication pursuant to Article 94(3) EPC dated Sep. 19, 2017, in Europe Patent Application No. 11778871.1, 6 pages.

* cited by examiner

CONSTRUCTING A TRANSPORT STREAM

This application is the National Stage of International Application No. PCT/EP2011/069263, filed Nov. 2, 2011, which claims priority to International Application PCT/EP2011/069051, filed Oct. 28, 2011, the disclosures of which are hereby incorporated by reference in their entirety.

FIELD OF THE INVENTION

The invention relates to a methods for arranging selected use of control words delivered to each of a plurality of receivers or groups of receivers, apparatus such as head-end apparatus for putting such methods into effect, and methods of operating receivers to process such streams. In particular, but not exclusively, the invention provides such aspects to support the delivery of control words to receivers for use in implementing fingerprinting schemes in which watermark symbols are embedded in content carried in the transport streams.

BACKGROUND OF THE INVENTION

Digital watermarking of content is well known. The content may comprise any type of information, and may include one or more of audio data, image data, video data, textual data, multimedia data, a web page, software products, security keys, experimental data or any other kind of data. There are many methods for performing digital watermarking of content but, in general, they all involve adding a watermark to an item of content. This involves embedding, or adding, watermark symbols (or a watermark codeword or payload data) into the original item of content to form a watermarked item of content. The watermarked item of content can then be distributed to one or more receivers (or users or recipients or receivers).

One particular application of digital watermarking is in the delivery of video signals in a digital video broadcasting (DVB) system, although many others exist. In television broadcast systems compliant with DVB standards, related video, audio and data content, such as video audio and program guide data for a single TV channel or group of TV channels, is processed by a broadcaster head-end system for delivery to receivers in an MPEG-2 data stream called a transport stream (TS). A transport stream comprises one or more content streams referred to as packetized elementary streams, each packetized elementary stream (PES) typically containing the data for one video, audio or data content aspect of one of the television channels. Each packet of a PES is typically spread across many smaller transport stream packets for broadcast, with the transport stream packets for the multiple PESs being multiplexed into a single transport stream for transmission.

Provisioning of protected DVB services is typically enabled using a conditional access (CA) system. Content data is encrypted in a broadcaster head-end system and delivered to receivers in TS packets along with metadata enabling each receiver to use the correct key, commonly referred to as a control word, to decrypt the content. Control word provision may be achieved using a smartcard, or other conditional access/digital rights management (CA/DRM) client at the receiver. Control words are usually sent to the receivers in encrypted form within entitlement control messages (ECMs) delivered in the TS using another elementary stream alongside elementary streams carrying video, audio and/or other data. The CA/DRM client decrypts data in the ECMs to retrieve the control words, using product keys which are updated periodically using entitlement management messages (EMMs), and delivers the control words as required to one or more decrypters in the receiver.

WO01/67667 describes a technique in which content can be delivered in an encrypted form to a plurality of receivers in such a manner that the content stream recovered at each receiver or subset of receivers carries a different set of watermark symbols, or fingerprint, from that recovered at other receivers or subsets of receivers. This is achieved by including in a content stream multiple (typically two) copies of some or all portions of the content, each copy carrying a different watermark symbol and being encrypted using a different control word than the other copies of the same content portion. By controlling the control words available at each receiver, the set of watermark symbols, or fingerprint, present in a content stream reconstructed at each receiver is controlled.

EP2341708 describes a similar scheme in which error handling capabilities of decrypters at the receivers are used to reject content portions for which the control word is not available at the receiver, so that only the intended watermark symbols are found in the reconstructed stream at a particular receiver. Multiple control words maybe delivered in a single ECM, and the CA/DRM client a the receiver may select a control word for use depending on a local fingerprint vector and selection data in the ECM. Alternatively, the CA/DRM client may derive a control word from seed and selection data delivered in the ECM.

EP2334070 describes ways in which the broadcaster head-end may be arranged to generate a suitable encrypted content stream for delivery to receivers in order to implement a similar fingerprinting scheme.

EP1111923 discusses ways in which the source of compromise of a conditional access system can be identified and traced by issuing selective product keys to particular groups of receivers. A binary search, for example, using different product keys for each of two halves of a subset of the receivers can quickly identify from which receiver keys are being copied and illicitly distributed.

It would be desirable to provide selective use of multiple control words delivered to receivers or groups of receivers, in particular to legacy receivers which do not have prior special functionality for this purpose. It would also be desirable to provide an fingerprinting or watermarking scheme in which this selective use was provided in legacy receivers. It would also be desirable to provide such as scheme in which one or more receivers which are the source of illicit distribution of control word, product key or other keyword data can be traced.

The invention addresses these and other problems and limitations of the related prior art.

SUMMARY OF THE INVENTION

The invention provides a method to distribute entitlements, for example in a legacy conditional access infrastructure, with increased security, by securely delivering two or more different control words to two or more different subsets of the conditional access client base where two or more of the control words are active and used for decryption in the same crypto period. One application of the invention is in being able to trace the identity of a receiver or receiver group which corresponds to a source of illicit distribution of key data. Another application is to drive selective decryption for fingerprinting using the normal entitlements that manage access to the broadcast content. One variant of this application can operate with existing CA/DRM clients by using a secondary ECM stream containing control words used to decrypt one or more primary ECM streams before control words are obtained from those primary streams by decrpytion. A second variant requires some additional functionality in a CA/DRM client to combine a control word derived from a secondary ECM stream with a control word from a primary ECM stream to yield a control word for use in content decryption. In another variant, primary and secondary product keys are combined in a CA/DRM client to provide a further product key which is used to obtain control words from an ECM stream.

In particular, the invention provides a method of enabling selected use of control words delivered to each of a plurality of receivers or groups of receivers, comprising: generating or establishing a plurality of sets of primary product keys, each set containing at least two different primary product keys; making available a primary product key of each set to each receiver or group of receivers, such that, at a particular time, each receiver or group of receivers is provided with a different combination of said primary product keys; for each set of primary product keys, providing to the plurality of receivers or groups of receivers a different primary entitlement control message corresponding to each primary product key of said set, each such primary entitlement control message comprising a primary control word which can be obtained through decryption using the corresponding primary product key.

Preferably, each such primary entitlement control message provides a primary control word which can be obtained through decryption using the corresponding primary product key, but not through decryption using any other primary product key of the set of primary product keys, and more preferably not through decryption using any other primary product key of all the sets.

Preferably, the said primary entitlement control messages corresponding to a particular set of primary product keys are provided to the plurality of receivers or groups of receivers such that all of the primary control words comprised in the primary control messages are active, in those receivers in which they are obtained through decryption, in the same crypto period. In particular, for each set of primary product keys, the receivers may be provided with a plurality of copies of a portion of content, each copy being encrypted such that it can be obtained through decryption using a different said primary control word, each such primary control word being obtained through decryption using a corresponding different primary product key of said set.

In fingerprinting applications of the invention, each copy of each portion of content may be watermarked such that each copy of any particular portion is watermarked with a different watermark symbol. In other applications of the invention, the product keys and/or control words available to each receiver or group of receivers may be used to determine which receiver or group of receivers is a source of illicitly distributed key data.

So that a particular group of sets of the primary product keys can be used efficiently, for example for more than one service or subscription package, secondary product keys can be additionally used. Each of a plurality of secondary product keys may be distributed to a different subset of receivers or groups of receivers. The use of secondary product keys can therefore greatly reduce the need for product key storage in a receiver CA/DRM client. In particular, the method may further comprise making available a secondary product key to a subset of said plurality of receivers or groups of receivers, and in the step of providing, each primary control word also requiring use of the secondary product key to obtain the primary control word from the primary entitlement control message by decryption. For example, primary and secondary control words could be combined by a mathematical operation such as an XOR operation, or primary and secondary product keys could be combined and the combination used to decrypt a primary ECM.

In an alternative scheme, the method further comprises making available a secondary product key to a subset of said plurality of receivers or groups of receivers, and in the step of providing, providing in the transport stream one or more secondary entitlement control messages, each such secondary entitlement control message comprising a secondary control word which requires the secondary product key to obtain by decryption, each primary entitlement control message being encrypted so as to require a said secondary control word, in addition to the corresponding primary product key, to obtain the comprised primary control word from the primary entitlement control message by decryption.

The content and entitlement control messages may be combined in a single transport stream. The various product keys may be delivered in the same transport stream, for example in EMMs, or may be delivered to receivers partly or wholly separately from this transport stream.

In addition to arrangements using the described sets of primary product keys, these techniques using primary and secondary product keys may also be used in other situations where two sets of product keys are needed in combination, for other purposes, and the invention therefore more generally provides methods and apparatus for combined used of secondary and primary product keys using these techniques.

Accordingly, the invention also provides a method of constructing a transport stream for delivery of digital content to a plurality of receivers, comprising including in the transport stream: a stream of encrypted portions of said content; a stream of primary entitlement control messages containing primary key data for use in decrypting at least some of said encrypted portions of said content, said stream of primary entitlement control messages being encrypted using second key data; and a stream of secondary entitlement control messages containing said second key data for decrypting at least a part of the stream of primary entitlement control messages. In particular, such a transport stream may include: first mapping data comprising a first content stream label identifying said stream of encrypted portions of said content, and a first conditional access stream label identifying said stream of primary entitlement control messages; and second mapping data comprising a second content stream label identifying said stream of encrypted primary entitlement control messages, and a second conditional access stream label identifying said stream of secondary entitlement control messages.

The invention also provides apparatus for putting into effect the described methods, for example a head-end apparatus comprising: a primary product key generator arranged to generate or provide or store a plurality of sets of primary product keys, each set containing at least two different primary product keys; a product key scheduler arranged to make available, at a particular time or time period, one and only one primary product key of each set to each receiver or group of receivers, such that each receiver or group of receivers is provided with a different combination of said primary product keys in that time period; and an ECM scheduler arranged to provide to the plurality of receivers or groups of receivers, for each set of primary product keys, a different primary entitlement control message corresponding to each primary product key of said set, each such primary entitlement control message comprising a primary control word which can be obtained through decryption using the corresponding primary product key.

Such a head-end may, for example, be further arranged to provide to the plurality of receivers or groups of receivers, for each set of primary product keys, a plurality of copies of a portion of content, each copy being encrypted such that it can be obtained through decryption using a different said primary control word, each such primary control word being obtained through decryption using a corresponding different primary product key of said set.

Where appropriate, the invention also provides corresponding methods carried out in receiver equipment, and corresponding modifications to receiver equipment.

The methods and apparatus as set out above may be implemented as appropriate in suitable hardware, software and combinations of the two, and to that end the invention also provides apparatus adapted to put into effect the steps of the described methods, one or more computer readable media comprising computer program code arranged to put other aspects of the invention into effect, and data signals carried on a telecommunications network or over other media comprising the transport streams discussed herein.

BRIEF DESCRIPTION OF THE DRAWINGS

Embodiments of the invention will now be described, by way of example only, with reference to the accompanying drawings, in which.

DETAILED DESCRIPTION OF EMBODIMENTS OF THE INVENTION

In the description that follows and in the figures, certain embodiments of the invention are described. However, it will be appreciated that the invention is not limited to the embodiments that are described and that some embodiments may not include all of the features that are described below. It will also be evident that various modifications and changes may be made to the embodiments described herein without departing from the broader spirit and scope of the invention as set forth in the appended claims.

Figure 1:
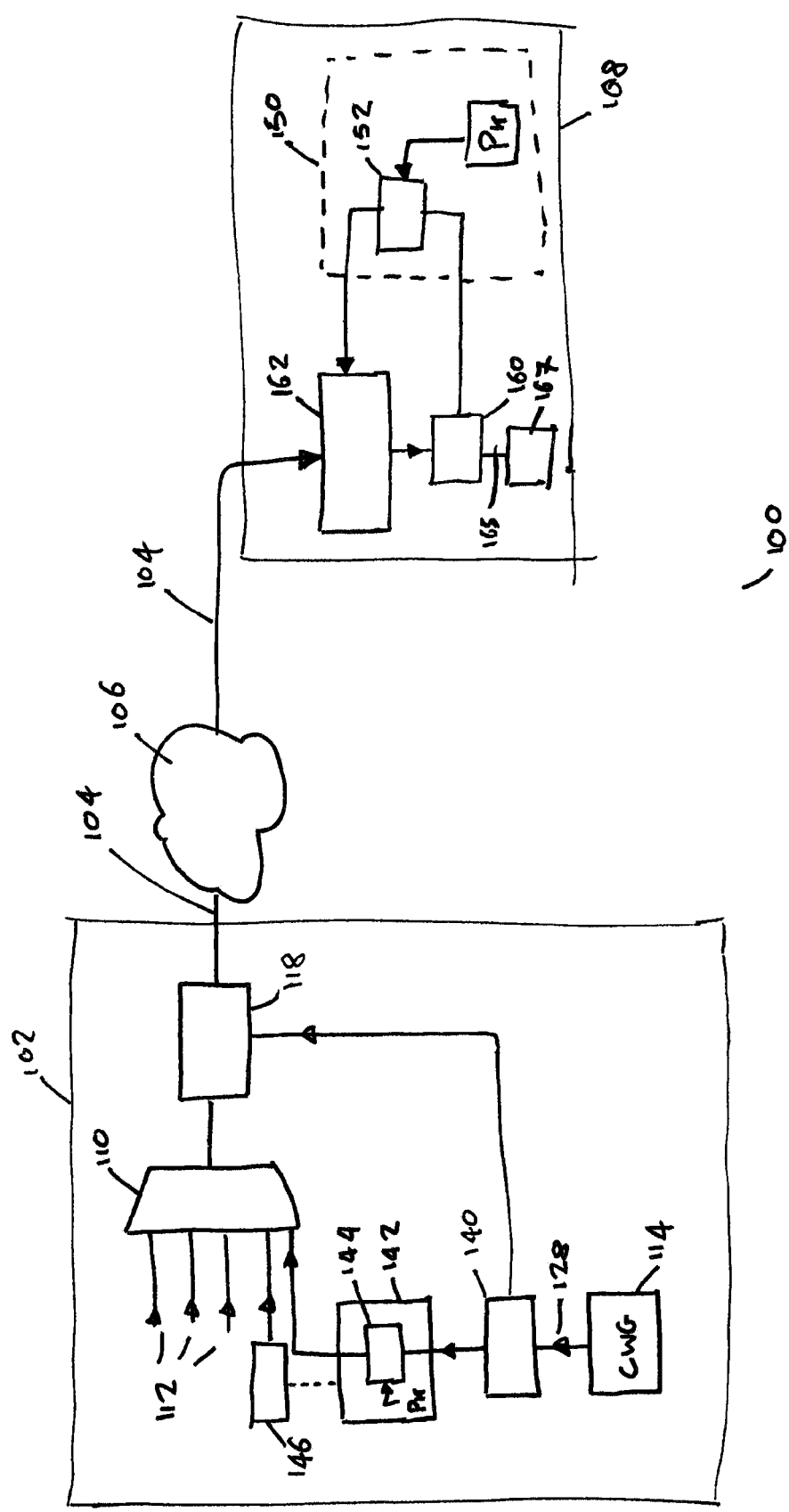
FIG. 1 illustrates a conditional access system 100, for example for use in delivery digital television data to a plurality of receivers 108.

Referring to FIG. 1 there is shown a schematic representation of a conditional access (CA) system 100 within which various aspects of the invention may be put into effect. The system comprises a head-end 102 for producing and sending a transport stream 104 containing encrypted digital content over one or more networks 106 to one or more receivers 108, which may for example be television set-top boxes and/or mobile terminals.

A multiplexer (MUX) 110 in the head-end 102 multiplexes various input streams, for example elementary streams 112 containing video, audio and electronic program guide content for a TV program, and produces a transport stream 104 comprising a sequence of transport stream (TS) packets, each having a header and a payload. The payload of most of these TS packets comprises data from one or other of the elementary streams 112. Depending on the content and its data type or format (for example audio, high-definition television etc) typically an MPEG-2 multi-service transport stream associated with one broadcast transmission frequency may comprise approximately ten television channels. A pay TV operator service package typically includes more than ten television channels so a number of separate MPEG-2 multi-service transport streams at different transmission frequencies are used to broadcast all television channels.

Figure 2:
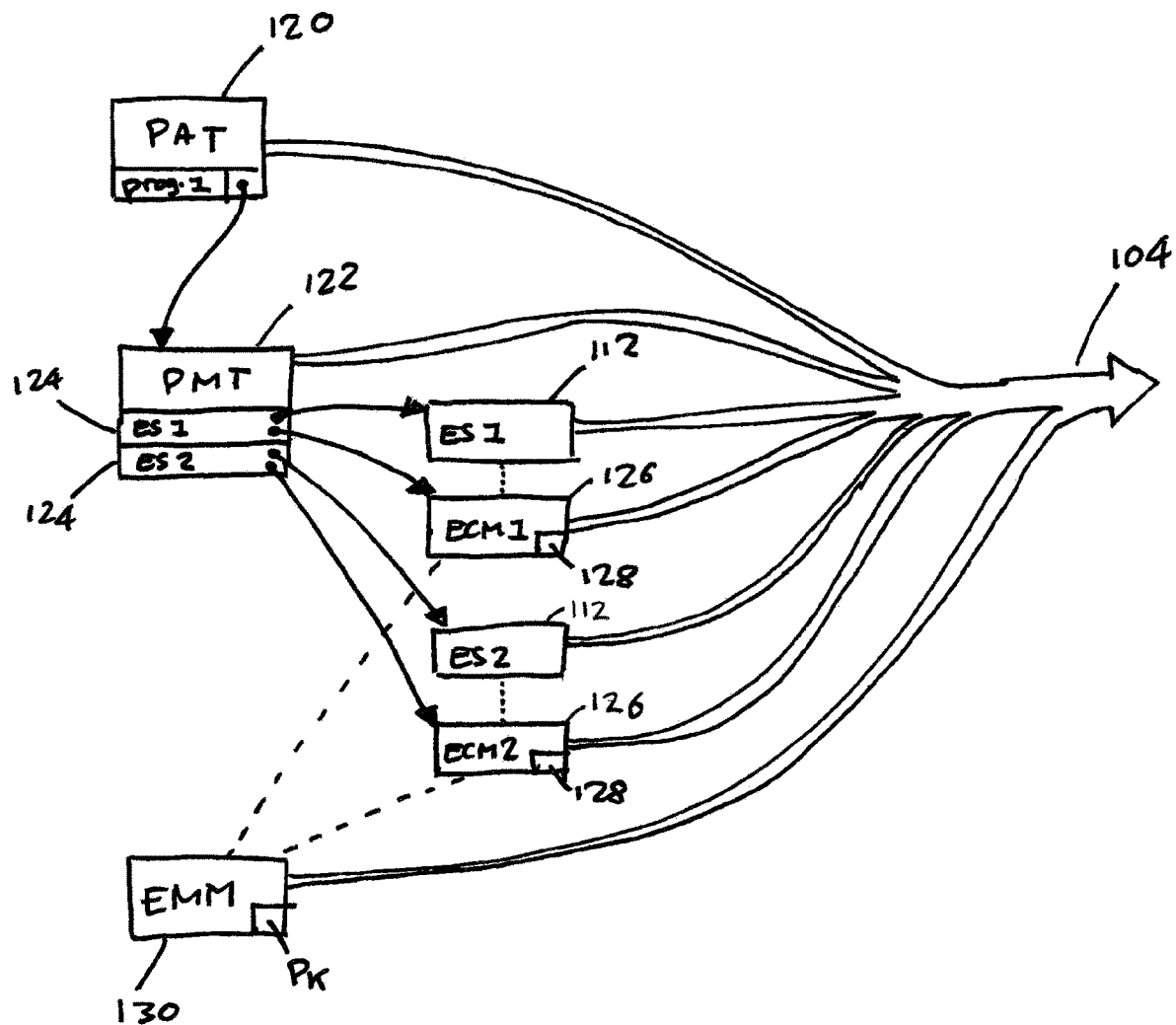
FIG. 2 shows the structure of a transport stream.

Metadata associated with the usage rights regarding the services in the transport stream may be incorporated by the head-end 102 into packets of the transport stream 104. Some aspects of this metadata based on those conventionally used in MPEG DVB systems are illustrated in FIG. 2. A program association table 120 (PAT) identifies one or more programs contained within the transport stream 104. By means of one or more suitable stream labels, typically in the form of transport stream packet identifiers (PID), the PAT enables receivers 108 to identify in and extract from the transport stream 104 packets containing a program map table 122 (PMT) associated with each program (for example each TV channel) contained in the transport stream 104. For simplicity, only one such PMT is shown in FIG. 2. Each PMT 122 provides mapping data contained in one or more PMT entries 124, each PMT entry identifying an elementary stream 112 belonging to that program, and each providing a suitable stream label, again typically as a packet identifier or PID, which enables a receiver to identify in the transport stream those packets containing data belonging to each elementary stream 112. Each PMT entry 124 also provides, where appropriate, conditional access data (or links to such data) including a stream label, again typically as a PID, enabling a receiver 108 to identify a stream of entitlement control messages 126 containing key data 128 which can be used to decrypt content received in the related elementary stream 112. The key data may typically be delivered in the form of a control word, and the key data is usually encrypted so that it cannot be extracted from the transport stream and used without further particular data as discussed below.

Each transport stream packet containing encrypted content may also include a scrambling status bit. Corresponding data provided in ECMs enables a receiver to load a new control word or other key data 128 at the right time so that transition from decryption with one control word to the next is handled smoothly.

The transport stream may also include a stream of entitlement management messages 130 (EMMs) usually directed to particular receivers or groups of receivers 108. In addition to defining various access rights for the receivers to which they are directed, EMMs 130 are used to convey a secret key (usually referred to as a product key Pk or a session key) used by a receiver 108 to decrypt entitlement control messages (ECMs) in order to recover the key data 128 in a useable form. Different product keys Pk may be provided to different receivers, and at different times, for example depending on access rights to be granted to a particular receiver, or for other reasons, so that different receivers 108 are enabled to decrypt different entitlement control messages. An entitlement control message typically contains a product key identifier on the basis of which a receiver can determine if it holds, and to use, the correct product key to decrypt an ECM. Instead of or as well as inclusion in the transport stream, EMMs may be transmitted to the receivers in other ways.

FIG. 1 shows how the metadata described above may be implemented in a conventional conditional access system. A control word generator (CWG) 114 periodically generates key data 128 in the form of control words, which are used by an encrypter 118 for encrypting the payload of at least some of the transport stream packets using an encryption algorithm provided, for example, by the DVB-Common Scrambling Algorithm (DVB-CSA), the Data Encryption Standard (DES) or the Advanced Encryption Standard (AES). Each control word is only valid during a predetermined period of time (the so-called crypto period or CP). In order to enable decryption of the transport stream packets at the receiver 108 the transport stream 104 needs to deliver the control words before they are used, and FIG. 1 illustrates one way in which this may be achieved. In the head-end system 102, the control words used for encrypting the payloads of the TS packets are routed via a synchronizer 140 into an entitlement control message generator (ECMG) 142. An encryption function 144 in the ECMG encrypts the control words under a product key Pk and produces entitlement control messages 126 carrying the control word in an encrypted form. The ECMs 126 as illustrated in FIG. 2 are inserted into the transport stream and transmitted to the receivers 108. The synchronizer 140 (which could be, for example, the SimulCrypt Synchroniser (SCS) in the DVB-SimulCrypt standard as described in ETSI TS 103197 v 1.4.1) synchronizes the ECM play-out relative to the relevant crypto periods.

Other metadata, such as the PAT, PMT and other mapping data for providing association between different parts of the transport stream may be inserted using mapping data generator 146 which, for example, may provide the mapping data as one or more further streams to the multiplexer 110.

The receiver 108 of FIG. 1 uses the metadata in the transport stream, for example as described above, to identify each transport stream packet, and if it contains encrypted content, to carry out decryption. This is achieved by the receiver identifying a relevant ECM stream 126 and hence the key data 128 or control word to load into the allocated decrypter 162 in order to decrypt the content. Each receiver 108 is typically provided with least one conditional access/digital rights management module (CA/DRM) 150 such as a smart card or the like. The receiver 108 also comprises a filter 160 for filtering EMMs and ECMs out of the transport stream 104. A processor 152 in the CA/DRM 150 subsequently decrypts the filtered ECMs 126 using a product key Pk stored in a secure memory of the smart card and returns the control words 128 to the decrypter 162 in the receiver which uses the control words for producing clear content 165 for passing to decoder 167, such as a video or audio decoder. Note that in most receivers the decrypter processes the transport stream before the filter 160, but packets identified as not encrypted are passed on to the filter without decryption being attempted.

Figure 3:
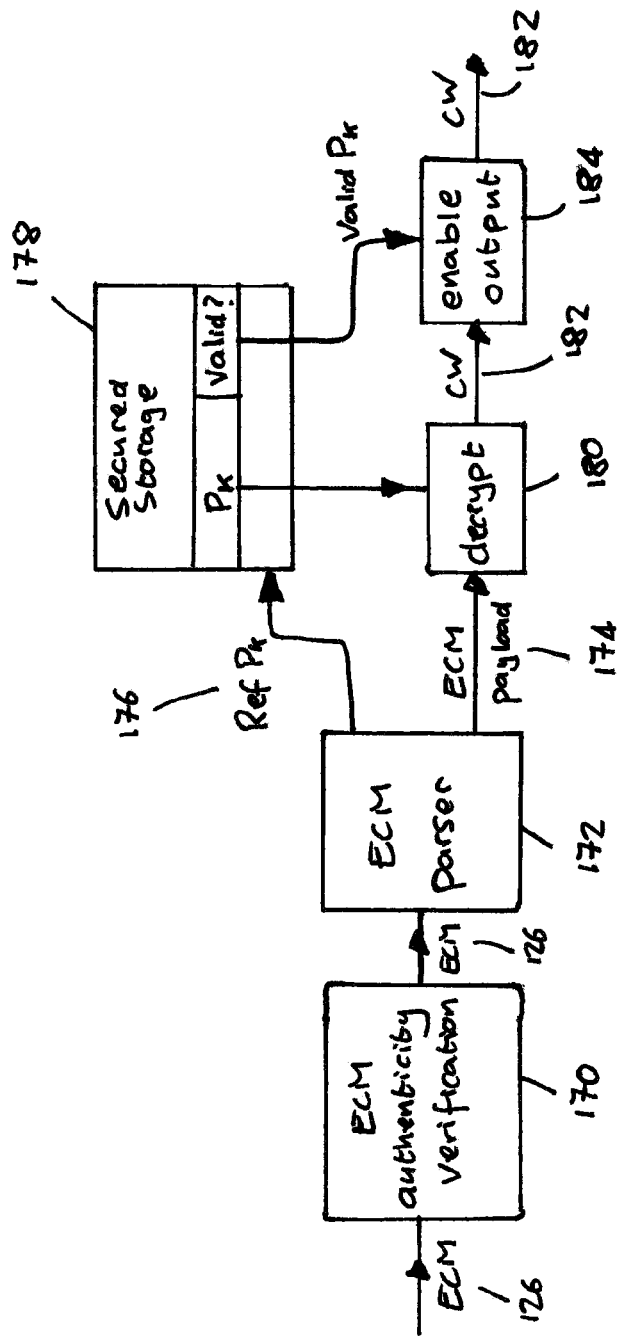
FIG. 3 illustrates processing of an ECM in a CA/DRM client.

Conventional conditional access schemes (as provided for example in the DVB-SimulCrypt standard as described in ETSI TS 103197 v 1.4.1) use a new ECM 126 for each new control word 128. Hence, each new ECM sent in the transport stream 104 to the receiver initiates a control word update cycle, i.e. provisioning and activation of a control word to the decrypter of the receiver. Although the head-end 102 is typically employed to transmit transport stream (TS) packets in accordance with the MPEG-2 standards (International Standard ISO/IEC 13818-1) via a terrestrial, satellite or cable broadcast system, the methods and systems outlined herein may also be employed to provide scrambled content in Internet Protocol (IP) packets to a receiver using other broadcasting, multicasting or point-to-point transmission techniques. FIG. 3 shows how ECMs may be processed in a receiver 108. After suitably configuring the filter 160 in the receiver 108, the CA/DRM client 150 receives ECMs 126. In the CA/DRM client 150 an authenticity verification check function 170 then verifies the authenticity of the ECM 126 to verify that it is from a legitimate source. An authenticated ECM 126 is then passed to an ECM parser function 172. The authenticated ECM typically contains an encrypted payload 174 (for example one or more encrypted control words) and a product key reference 176. The product key reference 176 is used to fetch the relevant product key Pk from secured storage 178 of the CA/DRM client 150. If it is present, the payload is decrypted using a decrypt function 180 using the product key Pk and the resulting control word 182 is returned to the receiver 108 for use in decrypting content. However, if the product key reference 176 points to a non-valid or absent product key then operation of an enable output function 184 in the CA/DRM client leads to no control word output being provided to the receiver 108.

The conditional access system of FIG. 1 may be adapted to include watermarking in the content delivered in the transport stream 104, for example as a measure against counterfeiting and copying of the content. WO01/67667 and EP 2341708 both describe techniques in which by duplicating portions of the content, applying a different watermark symbol to each copy, encrypting each copy differently, and providing selected combinations or series of control words to particular receivers or particular groups of receivers, each receiver or group of receivers reconstructs the content to contain a different series of watermark symbols, or different fingerprint. This technique can be used, for example, to identify using the fingerprint, from which group of receivers a particular copy of the content has been further distributed, for example by illegal copying. In EP 2341708 both of the differently watermarked and differently encrypted copies of each portion of content are passed to the decrypter 162 in the receiver 108, but the decrypter is loaded with the code word to successfully decrypt only one of the copies, leading to output of decrypted content, with decryption of the other copy leading to random data which is removed by the error detection function in the content decoder. The decoded output content stream therefore consists of only one of the copies of each duplicated content portion, with the watermark symbol contained therein determined by the control words made available to the receiver. The control of watermark symbol selection is thus located in the CA/DRM client 150, which makes it hard for an attacker to manipulate the watermarking process.

Some ways in which a conditional access system such as that of FIG. 1 may be compromised are discussed in EP1111923. This document also discusses ways in which such compromises can be identified and traced. For example, an attacker may gain access to the product keys Pk and/or the control words or other key data 128 received at that receiver 108, and distributes this data for use in other, unauthorised receivers 108. In such circumstances, the operator of the conditional access system may distribute product keys selectively to different ones of the receivers 108, on the basis of particular identity information such as a client code for each receiver or CA/DRM client 150. By monitoring which of these selectively distributed product keys are re-distributed by the attacker, the particular client code or CA/DRM client 150 from which the keys have been obtained can be identified for use in countermeasures. This can be achieved, for example, by using a binary division of the CA/DRM clients 150 to identify a first half within which the "cracked" CA/DRM client is a member. The process is repeated on the identified half, and so by binary division to find the cracked CA/DRM client.

Receivers described in EP 2341708 implement the watermarking/fingerprinting scheme described above by adding smartcard or other CA/DRM client functionality to select the appropriate control word to use in a receiver in a particular crypto period. A plurality of control words are delivered in a single ECM along with special selection data, and this ECM is decrypted using a product key. The control word to use in a particular crypto period, out of all the control words delivered in the single ECM, is selected for example using a fingerprint vector or other private information held in the smartcard in combination with the special selection data delivered in the ECM. In an alternative scheme, a seed value and selection data delivered in an ECM are used with the locally stored fingerprint data to generate a control word for use in a particular crypto period.

Figure 4:
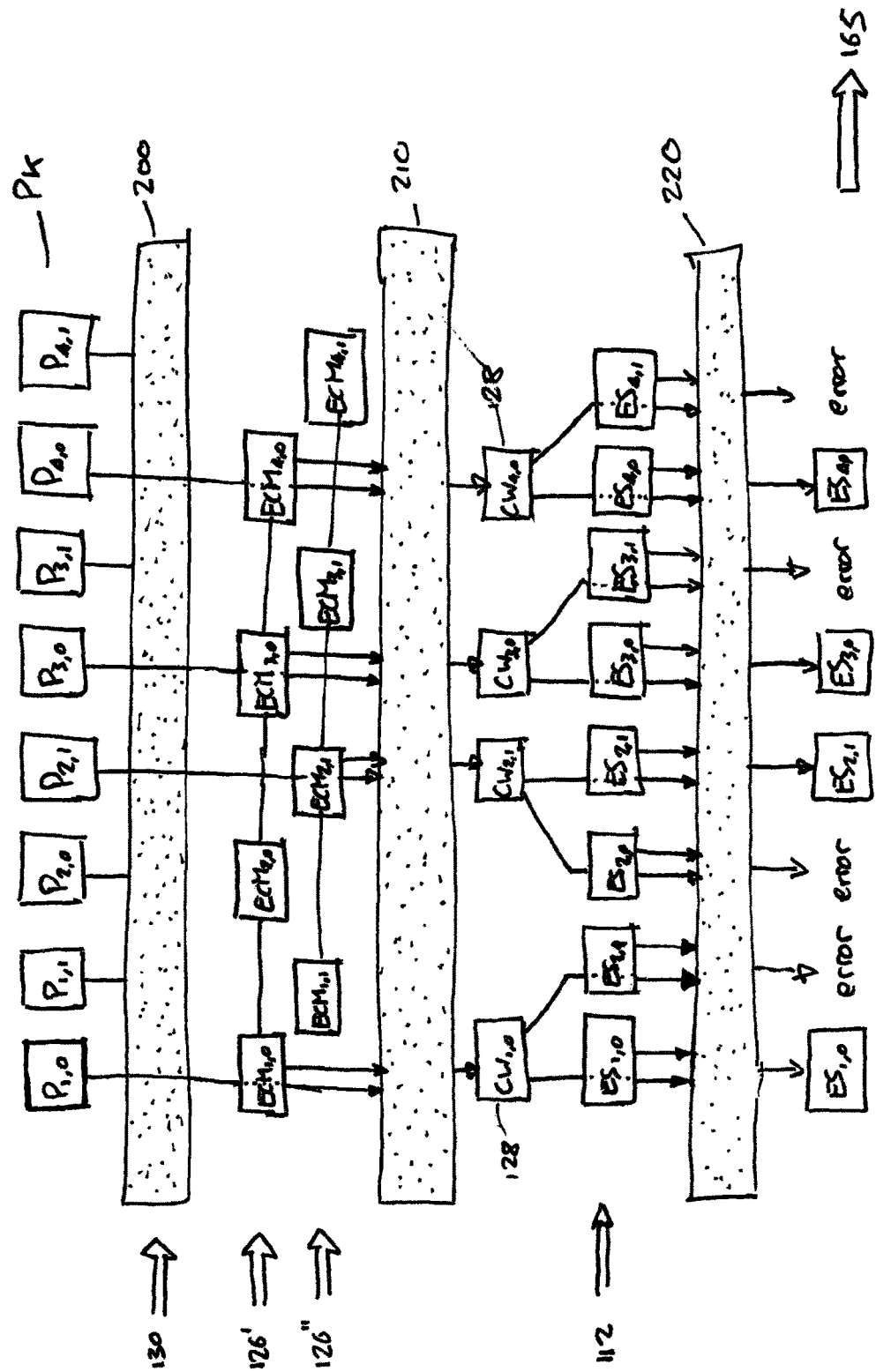
FIG. 4 demonstrates how a scheme for selective use of control words at receivers may operate in the context of a system as illustrated in FIG. 1 and with reference to FIG. 2.

FIG. 4 shows how a watermarking/fingerprinting scheme such as that described in EP 2341708 can be implemented in a conditional access system as already described above. The scheme of FIG. 4 can also be used to provide improved tracing of the source of a compromise of the conditional access system, by helping to identify a particular receiver from product key or other data passed on by an illicit user, and such improved tracing can be implemented in the scheme of FIG. 4 whether the scheme is used for watermarking/fingerprinting, or for some other purpose such as delivering differently encrypted copies of the same content portion to different receivers under a Simulcrypt scheme or similar.

To these and other ends, FIG. 4 shows a situation where the conditional access system 100 is set up to distribute to each of a plurality of receivers or groups of receivers a different selection from 2×N product keys, to thereby cause each receiver or group of receivers to recover a unique version of the content stream. The scheme used and illustrated in FIG. 4 does not require any new or special capability or programming of the receivers, so can advantageously be implemented in legacy systems. Streams arriving at the receiver 108 in the transport stream 104 are shown at the left, and the resulting decrypted content stream 165 is shown at the right side of the figure.

In FIG. 4, N=4 and the product keys are grouped into sets of two keys in each set, as P1,0, P1,1 . . . P4,0, P4,1. Each receiver 108 is provided by the conditional access system with one product key from each set, as shown by the product key distribution block 200 and the reception of EMM stream 130 representing the distribution of product keys Pk to a particular receiver, for example using the EMMs described above. The receiver operating in FIG. 4 holds product keys P1,0, P2,1, P3,0 and P4,0. Note that the product keys may be delivered wholly within, partly within or entirely separately to the transport stream if required.

Stream 126 shows the receipt at the receiver 104 of two ECM streams 126' and 126". ECM stream 126' contains sequential ECM messages ECM1,0 . . . ECM4,0 distributing a sequence of four control words. ECM stream 126" similarly contains sequential ECM messages ECM1,1 . . . ECM4,1 containing a sequence of four control words, which are at least pair wise different to the control words of stream 126'. Each ECM comprises a reference to the product key for the CA/DRM client 150 of the receiver to obtain the control word 128 by decryption, so that the receiver shown operating in FIG. 4 is only able to decrypt the ECM1,0, ECM2,1, ECM3,0 and ECM4,0 messages. The decryption of these ECMs using the available product keys is shown as block 210, resulting in control words CW1,0, CW2,1, CW3,0 and CW4,0 being passed by the CA/DRM client 150 to the descrambler 162 of the receiver for use in successive crypto periods. In other words, for each set of product keys, the transport stream includes a different ECM for each product key in the set. The control word in each such ECM can only be obtained by decryption using the corresponding product key.

The transport stream 104 also delivers elementary stream 112 to the receiver 108. This elementary stream consists of two copies of each of a plurality of content portions, each copy being encrypted with a different control word to the other copy. The first index (1 . . . 4) of each ES block in FIG. 4 denotes the content portion, and the second index which of the two copies is represented (1,0). Processing block 220 depicts attempted decryption by the decrypter 162 of each received content portion ES1,0 . . . ES4,1. Where the correct control word is available a successfully decrypted content portion is passed into output content stream 165. Where the correct control word is not available, random data is generated as a result of the decryption. The content decoder 167 will then discard this random data, although other schemes could be used to reject a content portion for which the correct control word is not available. The result is an output content stream 165 in which a selected one of the two copies of each content portion is present in the output stream 165, with the sequence of selected copies reproduced at a receiver being dependent upon which product key from each product key set is available for decrypting ECMs at the receiver.

If each copy of a particular content portion has inserted into it one of two watermark symbols, then this scheme can provide unique watermark fingerprints to each of 2N different receivers or groups of receivers. Using selected ones of four sets of two product keys in each set at the receiver, only $2^4=16$ different watermark fingerprints can be generated. Clearly, therefore, it may be desirable to use a larger number of sets of product keys, for example between about 10 and 16. Because these product keys can be updated far less frequently than the code words delivered by the ECMs, processing speed at the CA/DRM client is not critical in this respect, and the number of product keys that can be used is limited mostly by the memory capacity of the CA/DRM client. The number of product keys in each set can be greater than two if required, in order to provide similar capability for more than two copies of each content portion, for example to implement more than two different watermark symbols in each content portion or crypto period.

Various modifications and changes can be made to this fingerprinting scheme. Different numbers of copies of different portions could be used for example alternating between two copies and just one copy. Where more than one copy of a content portion is used it is not necessary to watermark or to always watermark all copies because leaving one copy without watermark can be detected as a different watermarking status, for example as a null watermark symbol. In some arrangements 100% or nearly 100% of content portions may be watermarked and included as multiple copies in the transport stream, and in other arrangements 10% or less of the content portions may be so treated. Other variations will be apparent to the skilled person.

The scheme of FIG. 4 can also be used to implement DVB schemes in which receivers of the transport stream may use two or more encryption modes, for example, under the Simulcrypt scheme. In such a scheme, a first part of the content stream may be unencrypted, and received in this form by all receivers, while a second part of the content stream is differently encrypted (using different control words and/or different encryption algorithms) for different receivers or groups of receivers.

The use of first and second, and optionally further ECM streams, and multiple sets of product keys as described above may be implemented in head-end apparatus as shown in FIG. 1, by inclusion of suitable functionality in, and/or by suitable configuration of existing functionality in the synchronizer 140, ECMG 142, mapping data generator 146 and elsewhere as required.

The scheme of FIG. 4 enables the rapid identification of one or more receivers which are the source of illicit distribution of control word, product key or other keyword data. Because each receiver or group of receivers is provided with a different combination of product keys from the sets of product keys. A group of such product keys distributed by an illicit source or attacker readily identifies the receiver or group of receivers from which the key data was obtained.

Schemes for fingerprinting or otherwise delivering multiple differently encrypted copies of content portions along the lines set out above and shown in FIG. 4 may be implemented by delivering two (or more) streams of ECMs 126' and 126" to the receivers in the transport stream 104 and arranging for both streams of ECMs to be associated by the receiver with the same elementary stream 112. This functionality may not generally be available in existing receivers 108. Prior art MPEG-2 based conditional access systems associate no more than one ECM stream 126 with each elementary stream 112, with program mapping tables containing only one conditional access descriptor for each elementary stream. However, it would be desirable to be able to implement the scheme of FIG. 4 without modifying or providing special functionality in the receivers.

Figure 5:
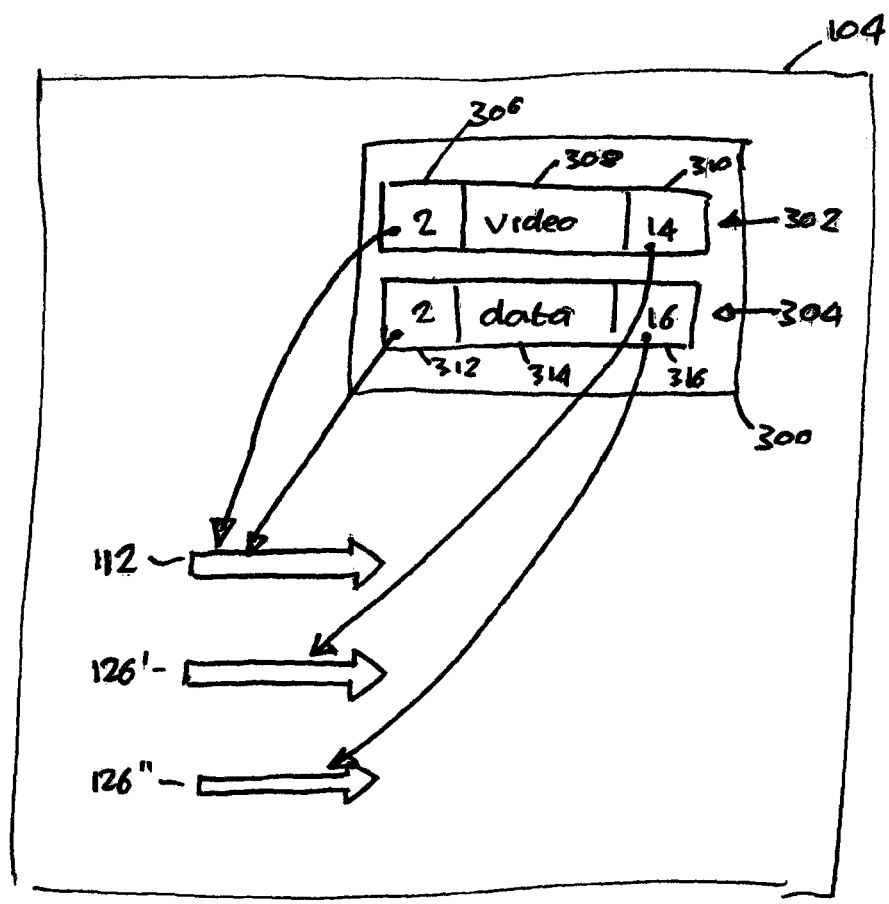
FIGS. 5 and 6 illustrate the structure of a transport stream for linking two or more ECM streams to a single elementary stream.

FIG. 5 illustrates mapping data 300 which may be included in a transport stream 104 in order to associate two ECM streams 126' and 126" with a single elementary or content stream 112, and in particular such a content stream containing encrypted content portions which can be decrypted using control words provided in the two ECM streams. The mapping data 300 includes first mapping data 302 and second mapping data 304. The first mapping data 302 contains a content stream label 306 which enables the receiver 108 to identify transport stream packets containing encrypted content which form part of a particular content stream 112. A first content data type 308 correctly identifies the type of content in the content stream 112, in this case as video data, so that the content stream can be correctly routed and handled in the receiver 108, for example by the appropriate decoders after decrypting. A first conditional access stream label 310 enables the receiver 108 to associate the first ECM stream 126' with the content stream 112, and therefore load control words derived from that ECM stream in the CA/DRM client into an descrambler to decrypt content from the content stream 112.

The second mapping data 304 contains a content stream label 312 which enables the receiver 108 to identify transport stream packets containing encrypted content which form part of the same content stream 112 as that identified by the first mapping data. A second conditional access stream label 316 then enables the receiver 108 to also associate the second ECM stream 126" with the content stream 112, and therefore load control words derived from that ECM stream in a CA/DRM client into a decrypter to decrypt content from the content stream. However, if the second mapping data 304 also correctly identified the data type of the content in the content stream 112, for example as video data, then this would trigger a selection process in at least some known receivers, typically requiring the user to select one or other of the streams which appear to be provided in the mapping data. Alternatively or additionally, this measure could cause prior art receivers to simply ignore either the first or second of the mapping data groups so that only one ECM stream was recognised and used for providing control words to the decrypter. To avoid such consequences, the second mapping data contains a second content data type 314 which does not correctly identify the type of content in the content stream. Preferably also, this second content data type is a data type which will not trigger any selection function in receivers, for example a non-video and non-audio type. Preferably, the second content data type is a data type for which there is no associated decoding capability in the receiver 108 In particular. Typically, DVB receivers are provided with specialist decoding functions for audio and video data, but not for other data types such as teletext, electronic program guide or general data types.

Figure 6:
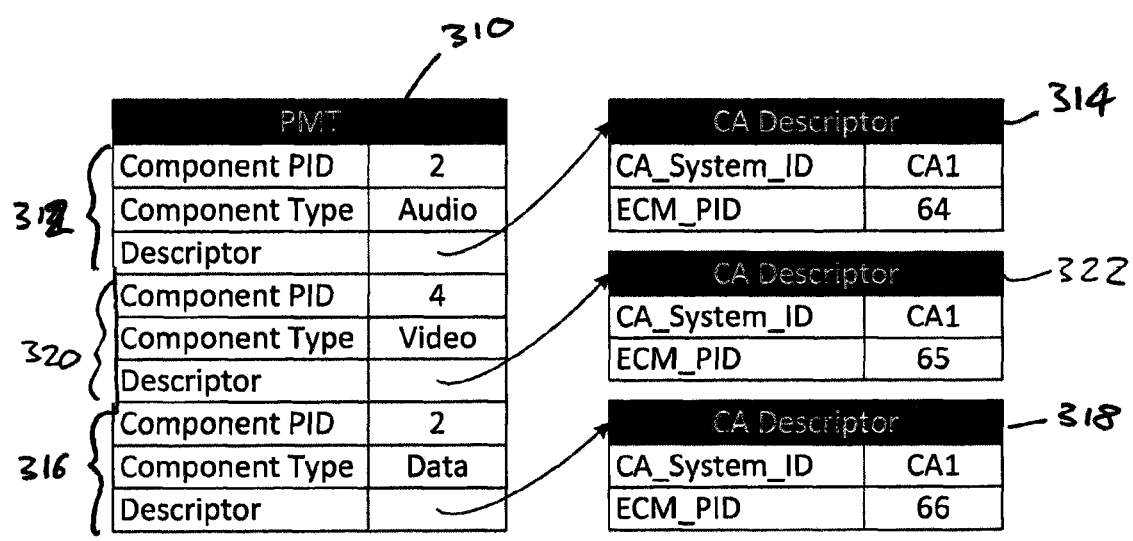

FIG. 6 shows how the first and second mapping data of FIG. 5 may be implemented in MPEG-2 Service Information data structures. The first and second mapping data 302, 304 are implemented together in a program mapping table (PMT) as discussed above. The first entry 312 in the PMT describes an audio content stream having a PID of 2, and pointing to a conditional access descriptor 314 specifying a PID 64 for the associated ECM stream. A third entry 316 in the PMT table also describes a content stream having a PID of 2, thereby associating with the same audio content stream as described by the first entry 312. However, the Component Type descriptor is "Data" instead of "Audio", so that the receiver will accept the entry and process the associated conditional access descriptor 318 which specifies a PID 66 for the associated ECM stream. In this way, the receiver 108 will associate both ECM streams 64 and 66 with the audio stream 2. The PMT table 310 also describes, in the second entry 320, a video content stream which is associated with a single conditional access descriptor 322 linking the video content stream to a single ECM stream with a PID of 65.

The arrangements described above in respect of FIGS. 5 and 6 may be used to enable receivers to process multiple ECM streams for decrypting content portions from a single encrypted content stream. In particular, and referring back to FIG. 4, the content stream may contain multiple copies of some or all of the content portions. The multiple ECM streams may then provide key data for decrypting all of the copies, but a receiver may be provisioned with only one product key from each set of product keys to decrypt key data sufficient only to obtain control words which can be used to decrypt a single copy of each content portion. Suitable provisioning of product keys to different receivers or subsets of receivers, for example using EMMs in the transport stream or some other mechanism (which may be separate to the transport stream) can then cause each different receiver or subset of receivers to decrypt a different combination of the copies of said content. Labelling each copy of a particular content portion with a different watermark symbol then leads to each receiver or subset of receivers to generate clear content with a different sequence of watermark symbols or fingerprint.

In FIGS. 5 and 6 only one extra group of mapping data is used to associate a single extra ECM stream with a particular content stream. However, further groups of mapping data specifying other ECM streams, and preferably defining different data types can be used to associate three or more ECM streams with a single content stream. This could be used, for example, where three or more differently watermarked and differently encrypted copies of each content portion are included in the transport stream.

The use of first and second mapping data as shown in FIGS. 5 and 6 therefore can be used to introduce mapping for a component stream for which there is no associated decoding capability in the receiver, such as a general data component stream. As the receiver does process the conditional access descriptor for such components, it allows the creation of an additional ECM stream for a component stream. The conditional access descriptor in the additional (dummy) component stream is associated with a PID value of the actual component stream. The ECM processing in the CA/DRM client 150 either results in loading a control word for the component stream or it will not return a control word, in particular if the required product key is not available. As the receiver 108 is configured such that all of the ECM streams are associated with the same video or audio content stream, the ECM processing results in loading the correct control word into the decrypter.

The use of first and second, and optionally further groups of mapping data as described above may be implemented in head-end apparatus as shown in FIG. 1, by suitably configuring the mapping data generator 146.

The scheme illustrated in FIG. 4 requires a unique combination of multiple product keys to be held at a receiver or group of receivers to provide decryption of a unique combination of control words so as to provide a unique fingerprint or other combination of content in the clear content stream generated at the receiver. However, to provide fingerprints or other combinations unique to each of a large number of receivers or groups of receivers, between about 10 and 24 sets of two product keys could be used. For a plurality of elementary streams or programs falling under a single subscription package it may be desirable to use a common group of sets of product keys for all streams of that package. However, if a multiple product key scheme similar to that described above is to be used for multiple subscription packages at a receiver, each requiring different product keys, then the total number of product keys to be held at the receiver could become impractical, requiring more storage and processing capability in the CA/DRM client 150, and requiring excessive transport stream bandwidth or bandwidth in another distribution mechanism to distribute the product keys in various combinations to different receivers. It would therefore be desirable to be able to use a single group of sets of product keys for two or more different elementary streams, different programs, or other groups of streams or programs falling under different subscription packages. This can be achieved in various ways as discussed below.

Figure 7:
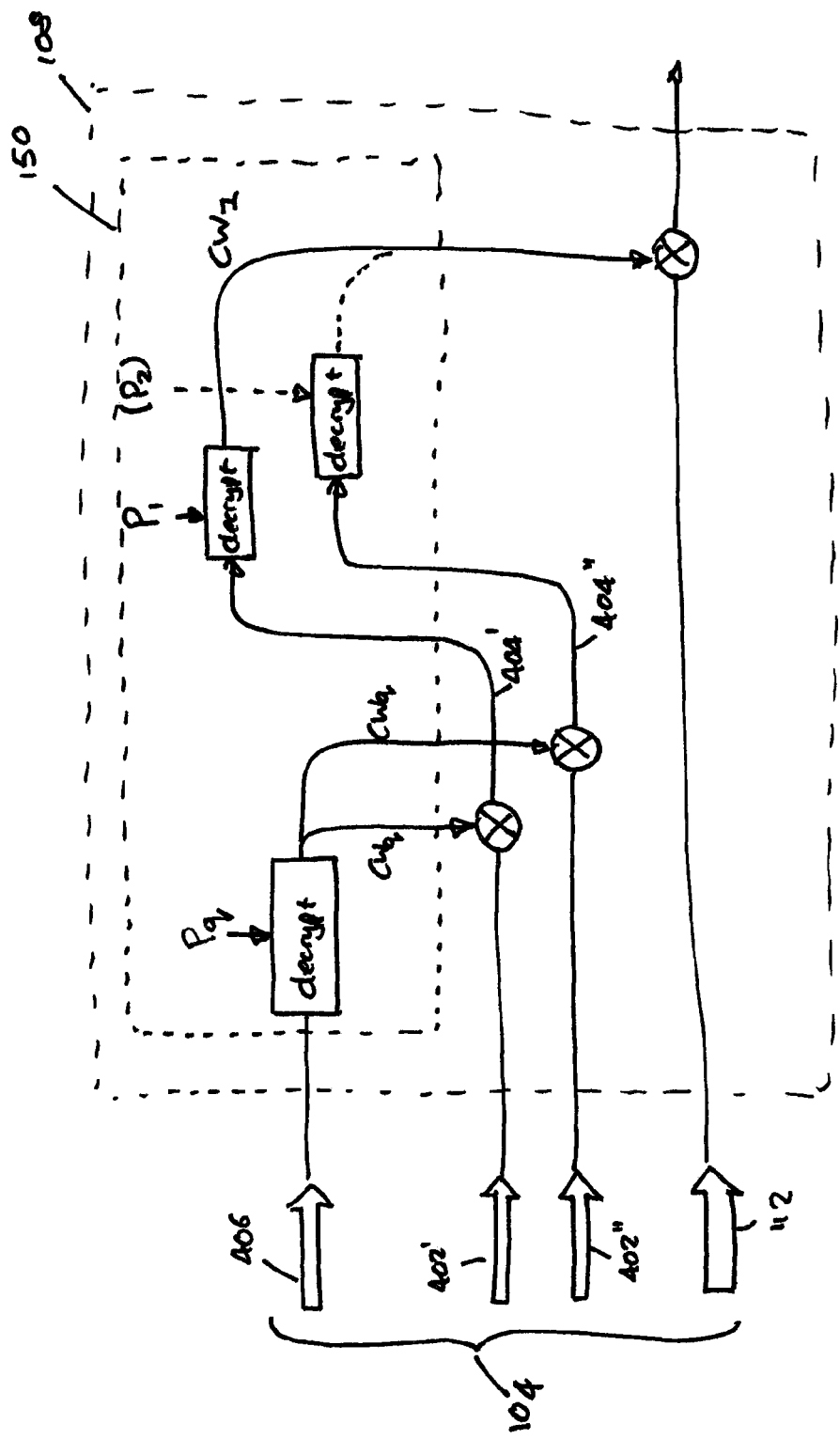
FIGS. 7 and 8 demonstrate the processing, at a receiver, of a transport stream in which one or more primary ECM streams are decrypted in the receiver using a control word derived from a secondary ECM stream.

FIG. 7 shows one way in which this need can be addressed by encrypting (or "super-encrypting") the two primary ECM streams 126' and 126" of FIG. 3 using a secondary control word CWq which is only available using a higher level or secondary product key Pq. In particular, FIG. 7 illustrates the processing of a suitably structured transport stream 104 in a receiver 108 having a decrypter 162 and CA/DRM client 150. The transport stream 104 of FIG. 7 is provided with an encrypted content stream 112, first and second primary encrypted ECM streams 402' and 402", and a higher level, secondary ECM stream 406. The first and second primary ECM streams 402' and 402" may correspond to the first and second ECM streams 126' and 126", but are super-encrypted, such that further decryption processing is required before the CA/DRM client 150 can process the ECMs to obtain the control words by decryption in the usual way. The control word CWq needed to decrypt the primary ECM streams 402' and 402" is distributed in encrypted form in the secondary ECM stream 406. When packets of this secondary ECM stream 406 are passed to the CA/DRM client 150 they are only decrypted to yield secondary control word CWq if the secondary product key Pq is available at that receiver. In this way, secondary product key Pq determines access to a particular subscription package, for example.

When secondary control word CWq is available, it can be used in the receiver 108 to decrypt primary ECM streams 402' and 402", to yield two normal primary ECM streams 404', 404" which can be used for example as shown in FIGS. 3-5. FIG. 6 shows these two normal primary ECM streams being passed to the CA/DRM client 150 where application of a lower level or primary product key P1 to a particular primary ECM message yields a primary control word CW1 which is used for decrypting content portions in the content stream 112 during a particular crypto period. At about the same time in FIG. 7, other primary ECMs in the other primary ECM stream cannot be decrypted because the required other primary product key P2 is not available. The CA/DRM client therefore provides no output of codewords in respect of this other primary ECM stream, as depicted in FIG. 7 by the broken line from missing product key (P2) to a decrypt block, and by the broken line output of that decrypt block. It therefore will be seen that, with reference to FIG. 4, decryption of primary ECMs in the decrypted ECM streams 404' and 404" may be dependent on which primary product key from a corresponding set or pair of primary product keys is available at the receiver, for example from four sets of two keys as shown in FIG. 4 or perhaps 10 to 24 pairs in a practical application of the described fingerprinting scheme.

The technique discussed in connection with FIG. 7 applies product keys at two levels and can be used in legacy receivers and CA/DRM clients without modification, by instead providing a suitably structured transport stream. Although FIG. 7 shows two encrypted primary ECM streams 402' and 402", just one such stream could be used. In other variations, further levels of ECM streams may be provided, such that each further such ECM stream gives rise to a further ECM processing step in the CA/DRM client 150.

In more general terms, the CA/DRM client processes the secondary ECM stream to obtain a codeword CWq that is used to decrypt one or more primary, encrypted ECM streams. After decrypting the one or more primary ECM streams, the filter 160 (shown in FIG. 1 for a conventional receiver but not shown in FIG. 7 for clarity purposes) forwards the primary ECM streams to the CA/DRM client. This second level of processing results in a primary control word that is used to decrypt the encrypted content stream 112. This construction of the transport stream 104 therefore causes the CA/DRM client 150 to process two ECMs before the primary control word to decrypt a portion of content is obtained. This additional processing makes it possible to combine two groups of product keys. For example, the secondary key or group of keys can be used to manage subscription packages, and the primary group of keys is then free for support of a fingerprinting or other scheme.

Figure 8:
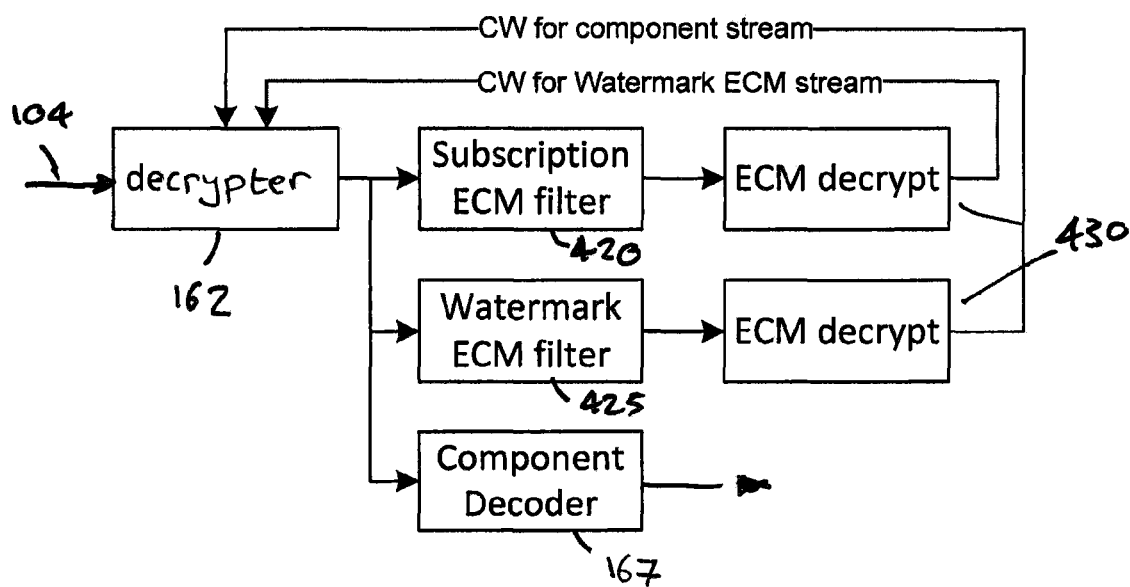

Whereas FIG. 7 illustrates the sequencing of ECM processing to obtain the control word that is used to decrypt the content stream 112, FIG. 8 shows in method or functional blocks how the implementation of this process using the conventional order of decrypting then filtering illustrated in FIG. 1 enables this to work. In this figure, the filter 160 of FIG. 1 is shown as two separate filter functions or steps: a subscription ECM filter function 420 which routes packets containing ECMs to be decrypted using one or more higher level or secondary product keys, and a fingerprint ECM filter function 425 which routes packets containing ECMs to be decrypted using one or more lower level or primary product keys, although in practice the two functions will be carried out by filter 160 without discrimination as to the type of ECM packets being routed. Following use of the ECMs decrypted with one or more lower level, primary product keys to pass control words to the decrypter to decrypt content, the decrypted content is forwarded to a component decoder, such as an audio or video decoder 167. As already shown in FIG. 7, two ECMs need to be processed by the CA/DRM client in the ECM decrypt stages 430 before a portion of content in content stream 104 can be decrypted. There can be more than one decrypted ECM stream where each additional encrypted ECM stream triggers an additional ECM decrypt step 430 in the CA/DRM client. This enables flexible combining of multiple product key hierarchies using the encrypted ECM streams, reducing the number of product keys which need to be stored and also reducing transmission bandwidth associated with these keys at the minor extra computational cost of ECM handling and decryption.

Figure 9:
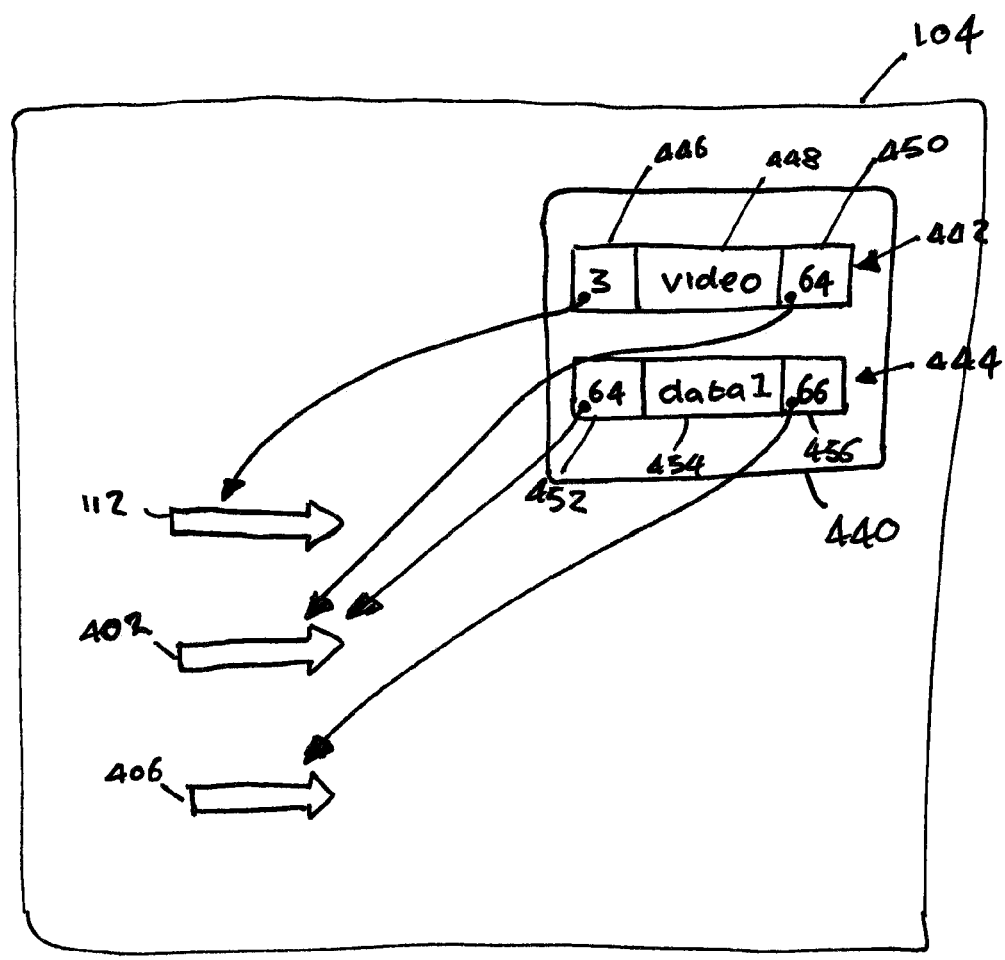
FIGS. 9, 10 and 11 illustrate the structure of a transport stream including a secondary ECM stream.

The described product key hierarchy technique can be implemented using existing functionality in receivers and CA/DRM clients by suitable configuration of the mapping data in the transport stream. FIG. 9 illustrates mapping data 440 which may be included in a transport stream 104 in order to associate a primary encrypted ECM stream 402 with an elementary or content stream 112, and a secondary ECM stream 406 with the primary, encrypted ECM stream 402. The mapping data 440 includes first mapping data 442 and second mapping data 444. The first mapping data 442 contains a content stream label 446 which enables the receiver 108 to identify transport stream packets containing encrypted content which form part of a particular content stream 112. A first content data type 448 identifies the type of content in the content stream 112, in this case as video data, so that the content stream can be correctly routed and handled in the receiver 108, for example by the appropriate decoder 167 after decryption. A first conditional access stream label 450 enables the receiver 108 to associate the primary ECM stream 402 with the content stream 112, and therefore load control words derived from that ECM stream in the CA/DRM client into a decrypter to decrypt content from the content stream 112. Note, however, that ECMs from encrypted primary ECM stream 402 will not be recognised as such and used to obtain decrypted control words until the primary ECM stream is decrypted.

The second mapping data 444 contains a stream label 452 and a conditional access stream label 456 which enables the receiver 108 to look to the secondary ECM stream 406 identified by the conditional access stream label 456 to obtain control words to unscramble primary ECM stream 402. The second mapping data 444 also contains a suitable second data type 454, such as "data1".

Figure 10:
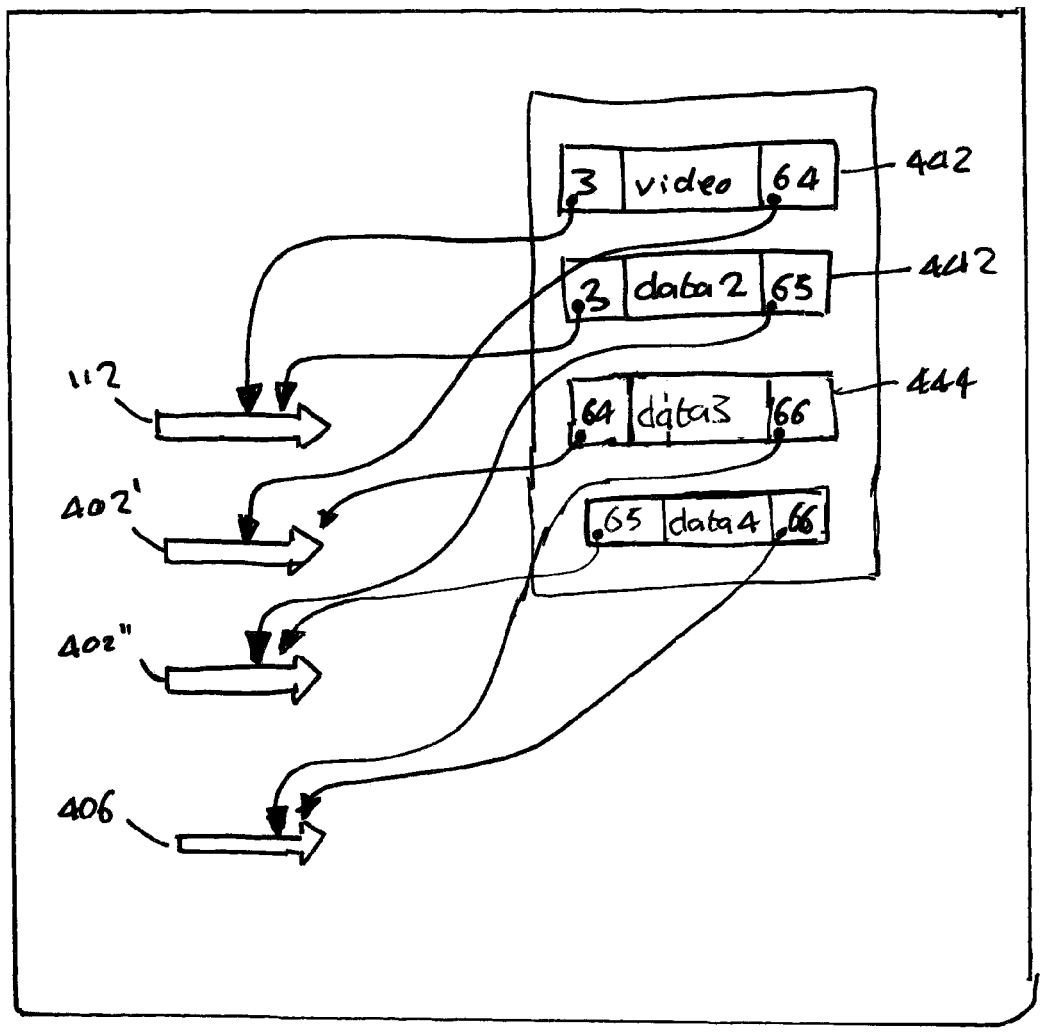

FIG. 10 shows how the mapping data of FIG. 9 may be combined with the way of using mapping data shown in FIGS. 5 and 6 to associate two primary ECM streams 402' and 402" with a single elementary stream 112, and to associate a single secondary ECM stream 406 with the two primary ECM streams so that ECMs from these streams can be selectively decrypted, according to availability at a particular receiver of a primary product key in each product key set. It will be seem that the first mapping data 442 now includes two entries, to link the two ECM streams 402' and 402" with the elementary stream 112. The second mapping data 444 now also includes two entries, to link the secondary ECM stream with both of the primary ECM streams.

Figure 11:
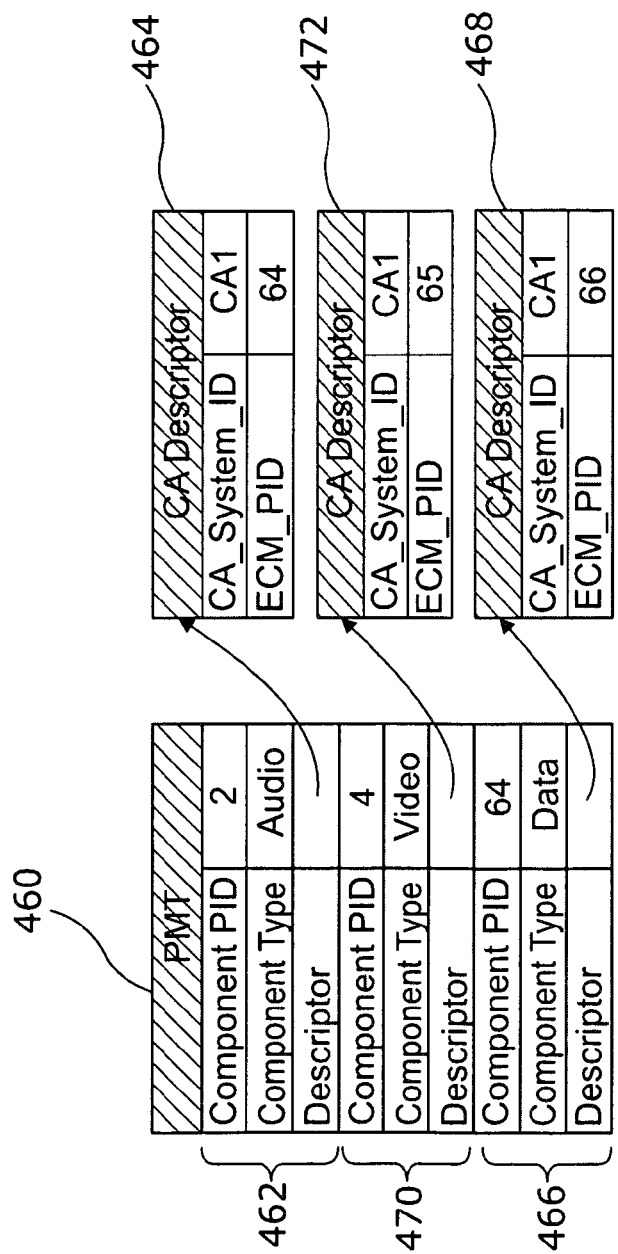

FIG. 11 shows how the first and second mapping data of FIG. 9 may be implemented in an MPEG-2 type conditional access system. The first and second mapping data 442, 444 are implemented together in a program mapping table (PMT) 460. The first entry 462 in the PMT describes an audio content stream having a PID of 2, and pointing to a first conditional access descriptor 464 specifying a PID 64 for the associated primary, encrypted ECM stream, which is the data stream specified in the third entry 466 of the PMT. The third entry 466 identifies, using "ECM_PID 66" in a third conditional access descriptor 468, the secondary ECM stream which is to be used to decrypt the primary ECM stream. The PMT table 460 also describes, in the second entry 470, a video content stream which is associated with a single conditional access descriptor 472 linking the video content stream to a single ECM stream with a PID of 65. Clearly, this arrangement can be extended to operate with arrangements such as that of FIG. 9 in which two or more primary ECM streams are used, and/or where higher level ECM streams such as tertiary ECM streams are used.

Figure 12:
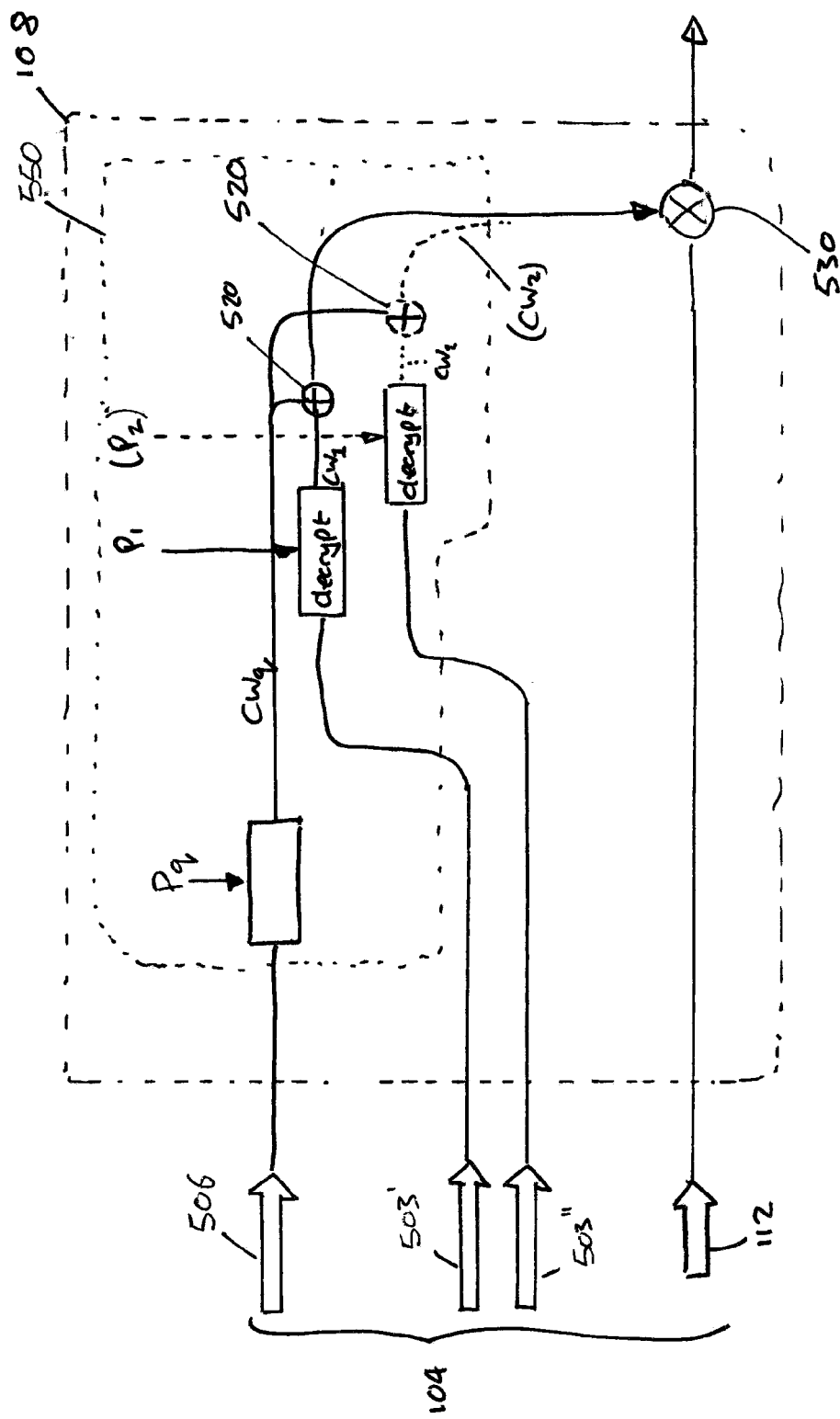
FIG. 12 shows an alternative way of combining a secondary ECM stream with one or more primary ECM streams at a receiver.

FIG. 12 is similar to FIG. 7, but shows an alternative way of implementing a hierarchy of product keys in a conditional access systems such as that of FIG. 1. According to the arrangement of FIG. 12, the two primary ECM streams 503' and 503" are not further encrypted or super-encrypted, although the control words carried in these streams are protected by encryption in the usual way. Either one of the control words CW1 and CW2 distributed by a particular ECM can therefore be recovered in the usual way by CA/DRM client 550 by decryption using whichever primary product key of the corresponding product key set is available at the receiver.

Secondary ECM stream 506 also gives rise, through use of a corresponding product key Pq in the CA/DRM client 550, to a secondary control word CWq. To yield the control word to be used to decrypt elementary stream 112 in the current crypto period, the secondary control word Pq is combined in some way with the primary control word CW1 or CW2. This combination could, for example, be by means of an XOR or other binary operation, an addition, subtraction, or other mathematical operation. This operation step is represented in FIG. 11 by operation elements 520, and the decryption of the elementary stream 112 in the current crypto period by operation element 530.

Figure 13:
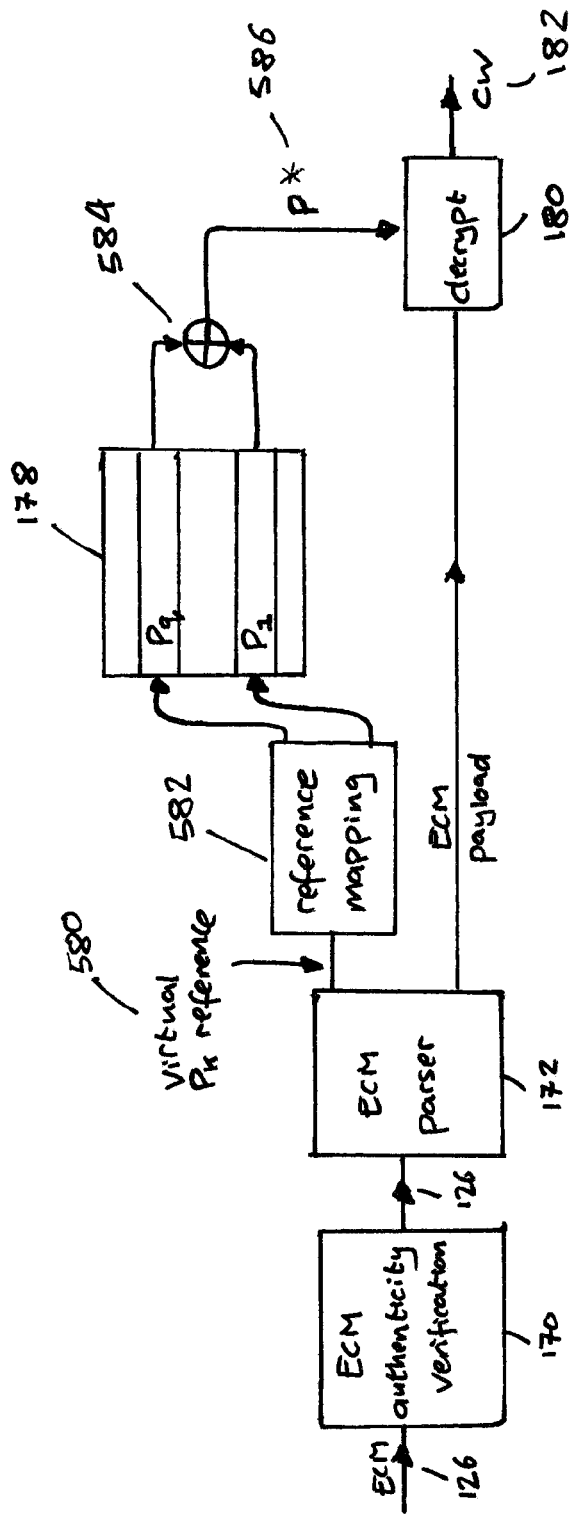
FIG. 13 shows a way of combining primary and secondary product keys at a receiver to decrypt a primary ECM stream.

FIG. 13 shows another way in which primary and secondary product keys may be used in combination in a receiver 108. FIG. 13 is similar to FIG. 3 in showing functionality or operation of a CA/DRM client 150 within a receiver 108. An incoming ECM 126 is verified by an ECM authenticity verification function 170 before being passed to an ECM parser 172. However, instead of containing a reference to a specific product key, the ECM in this example contains a virtual or indirect product key reference 580. The virtual product key reference is passed to a reference mapping function 582 in the CA/DRM client which interprets the virtual product key reference as indicating two (or more) particular product keys which may or may not both be found in the secure storage 178 of the CA/DRM client. Typically, one such product key will be a primary product key, shown in FIG. 13 as P1, forming part of a set of product keys as discussed above, while another such product key identified from the virtual product key reference 582 will be a secondary product key, shown in FIG. 13 as Pq because it performs essentially the same end role as the corresponding secondary product keys Pq shown in FIGS. 7 and 12 and discussed above.

If both the primary and secondary product keys identified by resolving the virtual product key reference 582 are available in the secure storage 178 then these product keys are combined in some way at combination function 584 to yield a resolved product key 586 shown in the figure as P* which is used to decrypt the ECM payload to provide a control word 182 for output to the receiver as already described. This combination function could be, for example, a summation or addition function, or an XOR or other binary operation. If one or both of the primary and secondary product keys identified from the virtual product key reference 580 by the reference mapping function 582 are not available or invalid then an enable output function (not illustrated) can be used similar to as shown in FIG. 3, to prevent output of a control word from the CA/DRM client.

Using the arrangement of FIG. 13, multiple sets of primary product keys can be used for more than one service, subscription package, or other content distribution control, by provision of selected secondary product keys to particular CA/DRM clients and subsets of CA/DRM clients.

The use of first and second, and optionally further groups of mapping data as described above, and the delivery of primary and secondary product keys, suitable ECM streams and associated metadata, may be implemented in head-end apparatus as shown in FIG. 1, by suitable configuration of mapping data generator 146 and other components. Similarly, the described encrypted and other ECM streams required to put the technique into effect may be implemented in head-end apparatus as shown in FIG. 1, by suitable configuration and control of the ECMG 142 and synchronizer 140. In this way, embodiments of the invention can be implemented in existing, legacy head-end apparatus.

Figure 14:
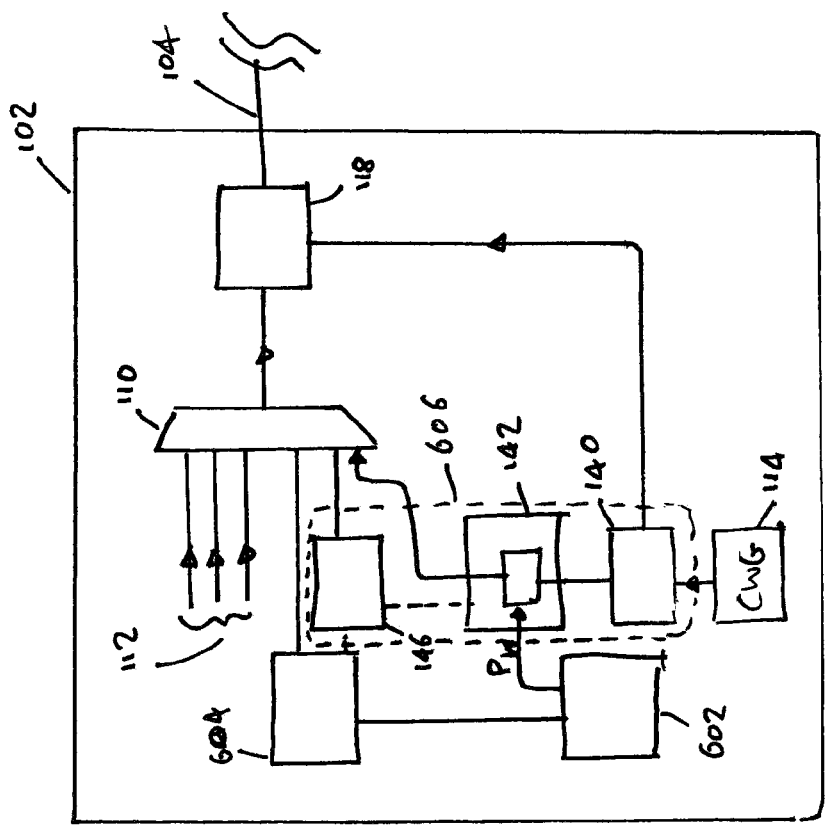
FIG. 14 shows functional aspects of a head-end for implementing sets of product keys to control selective control word access according to the invention.

FIG. 14 shows one way in which an existing or legacy head-end apparatus may be controlled to put the invention into effect. In FIG. 14 a primary product key generator function 602 is shown which is arranged to generate a plurality of sets of primary product keys as discussed above, each set containing at least two different primary product keys. A product key scheduler function 604 is then arranged to make available one and only one primary product key of each set to each receiver or group of receivers, such that each receiver or group of receivers is provided with a different combination of said primary product keys. In FIG. 14 this is achieved by inserting suitable EMMs into the transport stream 104, although such EMMS can be delivered to the receivers in other ways. Suitable configuration of the synchronizer 140, ECM generator 142, mapping data generator 146, and other components as necessary then form an ECM scheduler arranged to provide to the plurality of receivers or groups of receivers, for each set of primary product keys, a different primary entitlement control message corresponding to each primary product key of said set, each such primary entitlement control message comprising a primary control word which can be obtained through decryption using the corresponding primary product key. Such apparatus can be suitably arranged to perform any of the functionality discussed above.

Generally, the functionality in the head-end as discussed herein may be implemented in hardware, software, or a combination of both. Accordingly, when functionality such as that of generating and including in the transport stream suitable mapping data, ECM streams and so forth is discussed, this functionality may be provided as computer program elements, which may be stored in a volatile computer memory, a non-volatile memory, on hard disks or removable media such as CDROM or DVD data disks, and may also be transmitted as a data signal over a network or other telecommunications connection.

It will be understood that variations and modifications may be made to the described embodiments without departing from the scope of the invention as defined in the appended claims. For example, it is to be understood that any feature described in relation to any one embodiment may be used alone, or in combination with other features described, and may be used in combination with one or more features of any of the other embodiments, or any combination of the other embodiments.

The invention claimed is:

1. A method, implemented by one or more processors, of enabling selected use of control words for decrypting content, said control words being distributed to each of a plurality of receivers or groups of receivers, the method comprising:
   establishing a plurality of sets of primary product keys, each set containing at least two different primary product keys;
   making available one and only one primary product key of each set to each receiver or group of receivers, such that each receiver or group of receivers is provided with a different combination of said primary product keys;
   for each set of primary product keys, providing to the plurality of receivers or groups of receivers a different primary entitlement control message corresponding to each primary product key of said set, each such primary entitlement control message distributing a primary control word for recovery through decryption using the corresponding primary product key, the primary control word being configured to decrypt content.

2. The method of claim 1 wherein, in the step of providing, each such primary entitlement control message distributes a primary control word recoverable through decryption using the corresponding primary product key, but not through decryption using any other primary product key of the set of primary product keys.

3. The method of claim 1, wherein the primary entitlement control messages corresponding to a particular set of primary product keys are provided to the plurality of receivers or groups of receivers such that all of the primary control words distributed using the primary control messages are active, in those receivers in which they are recovered through decryption, in the same crypto period.

4. The method of claim 1 further comprising:
   providing to the plurality of receivers or groups of receivers, for each set of primary product keys, a plurality of copies of a portion of content, each copy being encrypted such that it can be obtained through decryption using a different said primary control word, each such primary control word being recovered through decryption using a corresponding different primary product key of said set.

5. The method of claim 4 further comprising, for each portion of content, watermarking each copy of said portion of content with a different respective watermark symbol.

6. The method of claim 1 further comprising making available a secondary product key to a subset of said plurality of receivers or groups of receivers, and in the step of providing, each primary control word also requiring use of the secondary product key to recover the primary control word from the primary entitlement control message by decryption.

7. The method of claim 6 wherein in the step of providing, each primary control word is recovered by combining a result of decryption of a primary entitlement control message using a corresponding primary product key with a result of decryption of a secondary entitlement control message using a corresponding secondary product key.

8. The method of claim 6 wherein in the step of providing, each primary control word requires use of a combination of the corresponding primary product key with the secondary product key to recover the primary control word from the primary entitlement control message by decryption.

9. The method of claim 6 wherein said secondary product key is made available by inclusion in one or more entitlement management messages included in a transport stream.

10. The method of claim 1 further comprising making available a secondary product key to a subset of said plurality of receivers or groups of receivers, and in the step of providing, providing one or more secondary entitlement control messages, each such secondary entitlement control message distributing a secondary control word which requires the secondary product key to recover by decryption, each primary entitlement control message being encrypted so as to require a said secondary control word in addition to a said corresponding primary product key of said set to recover the distributed primary control word from the primary entitlement control message by decryption.

11. The method of claim 10 wherein each primary entitlement control message is encrypted so as to require a said secondary control word to decrypt said primary entitlement control message before the primary control word can be recovered through decryption using the corresponding primary product key.

12. The method of claim 10 wherein the primary entitlement control messages are contained within one or more first entitlement control streams of a transport stream, and the one or more secondary entitlement control messages are contained within a second entitlement control stream of said transport stream, the method further comprising including in said transport stream:

first mapping data comprising one or more first conditional access stream labels identifying said one or more first entitlement control streams; and second mapping data comprising a second content stream label identifying said one or more first entitlement control streams, and a second conditional access stream label identifying said second entitlement control stream.

13. The method of claim 12 wherein the first mapping data further comprises a first content stream label identifying a stream of portions of content encrypted so as to require at least some of said primary control words to obtain by decryption.

14. The method of claim 12 wherein the first mapping data and second mapping data are first and second entries in an MPEG program mapping table included in the transport stream.

15. The method of claim 14 wherein the first and second conditional access stream labels are included in conditional access descriptors of the MPEG program mapping table.

16. The method of claim 1 wherein said primary product keys are made available by inclusion in one or more entitlement management messages included in a transport stream.

17. A head-end comprising:

a primary product key generator arranged to generate a plurality of sets of primary product keys, each set containing at least two different primary product keys;

a product key scheduler arranged to make available one and only one primary product key of each set to each receiver or group of receivers at a particular time, such that each receiver or group of receivers is provided at that time with a different combination of said primary product keys; and an entitlement control message scheduler arranged to provide to the plurality of receivers or groups of receivers, for each set of primary product keys, a different primary entitlement control message corresponding to each primary product key of said set, each such primary entitlement control message distributing a primary control word which can be obtained through decryption using the corresponding primary product key, the primary control word being configured to decrypt content.

18. The head-end of claim 17 further arranged to provide to the plurality of receivers or groups of receivers, for each set of primary product keys, a plurality of copies of a portion of content, each copy being encrypted such that it can be obtained through decryption using a different said primary control word, each such primary control word.

* * * * *